(12) United States Patent
Balzano

(10) Patent No.: US 7,121,560 B1
(45) Date of Patent: Oct. 17, 2006

(54) SKI ASSEMBLY FOR A STROLLER

(76) Inventor: Dominic Balzano, 45 Woodhall St., Brooklyn, NY (US) 11231

( * ) Notice: Subject to any disclaimer, the term of this patent is extended or adjusted under 35 U.S.C. 154(b) by 264 days.

(21) Appl. No.: 10/773,919

(22) Filed: Feb. 9, 2004

(51) Int. Cl.
*B62B 19/00* (2006.01)

(52) U.S. Cl. .................. 280/11; 280/9; 280/763.1; 280/28.16

(58) Field of Classification Search ............ 280/47.38, 280/763.1, 764.1, 767, 7.12, 9, 28.16, 10, 280/11, 809
See application file for complete search history.

(56) References Cited

U.S. PATENT DOCUMENTS

| | | | |
|---|---|---|---|
| 1,416,454 A | 5/1922 | Douglas | |
| 2,087,069 A | 7/1937 | Pascolesco | |
| 2,319,008 A | 5/1943 | McCormack | |
| 2,352,966 A * | 7/1944 | Morando | 280/8 |
| 2,443,699 A * | 6/1948 | Swain | 280/13 |
| 2,539,686 A | 1/1951 | Ballentine | |
| 2,817,536 A * | 12/1957 | Taggert | 280/11 |
| 3,774,926 A * | 11/1973 | Chase | 280/13 |
| 4,251,085 A * | 2/1981 | Lageer et al. | 280/10 |
| 4,307,892 A * | 12/1981 | Miles | 280/9 |
| 4,479,657 A * | 10/1984 | Reynolds | 280/8 |
| 4,589,668 A * | 5/1986 | Mares | 280/8 |
| 4,778,190 A * | 10/1988 | Meredith | 280/7.12 |
| 5,407,217 A | 4/1995 | Lambert et al. | |
| 5,413,361 A * | 5/1995 | Mosher | 280/7.12 |
| 5,427,390 A | 6/1995 | Duncan et al. | |
| 6,708,989 B1 * | 3/2004 | Braun | 280/7.12 |

* cited by examiner

*Primary Examiner*—Jeff Restifo

(57) ABSTRACT

A ski assembly for a stroller for allowing more proficient movement through snow includes a ski attachment for a stroller assembly having a chair portion, a back portion, a plurality of wheels is attached to the chair portion. The attachment includes a leg having an upper end and a lower end. A ski has an upper surface, a lower surface, a back end and a front end. The lower end of the leg is attached to the upper surface of the ski. The leg is rotatably coupled to the chair portion such that the ski may be positioned in a substantially horizontal lowered position or in a substantially vertical lifted position adjacent to the chair portion.

6 Claims, 4 Drawing Sheets

SKI ASSEMBLY FOR A STROLLER

BACKGROUND OF THE INVENTION

1. Field of the Invention

The present invention relates to ski attachment devices and more particularly pertains to a new ski attachment device for providing improvement through the snow for a stroller.

2. Description of the Prior Art

The use of ski attachment devices is known in the prior art. U.S. Pat. No. 2,539,686 describes a runner attachment for a baby carriage which includes runners to be attached to the wheels of the carriage. Another type of ski attachment device is U.S. Pat. No. 5,407,217 which includes a detachable ski assembly for a stroller so that both of the front and rear wheels of the stroller are positioned on a ski. Yet another such device is U.S. Pat. No. 5,427,390 which includes skis that may each be attached to one of the wheels of a stroller or carriage.

While these devices fulfill their respective, particular objectives and requirements, the need remains for a device that attaches a ski to a stroller in such a manner that the ski is easily moved from a engaged to a disengaged position without having to physically remove the entire ski device from the stroller. This will allow more proficient moving through snow but will then also provide a means for returning to the wheels of the stroller for areas of little or no snow.

SUMMARY OF THE INVENTION

The present invention meets the needs presented above by providing a retrofittable ski attachment for a stroller. The ski attachment may be moved from a lifted or lowered position depending on the needs of the user of a stroller.

Another object of the present invention is to provide a new ski attachment device that includes an actuator for selectively moving the ski between the lowered and lifted positions.

To this end, the present invention generally comprises a ski attachment for a stroller assembly having a chair portion, a back portion, a plurality of wheels is attached to the chair portion. The attachment includes a leg having an upper end and a lower end. A ski has an upper surface, a lower surface, a back end and a front end. The lower end of the leg is attached to the upper surface of the ski. The leg is rotatably coupled to the chair portion such that the ski may be positioned in a substantially horizontal lowered position or in a substantially vertical lifted position adjacent to the chair portion.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
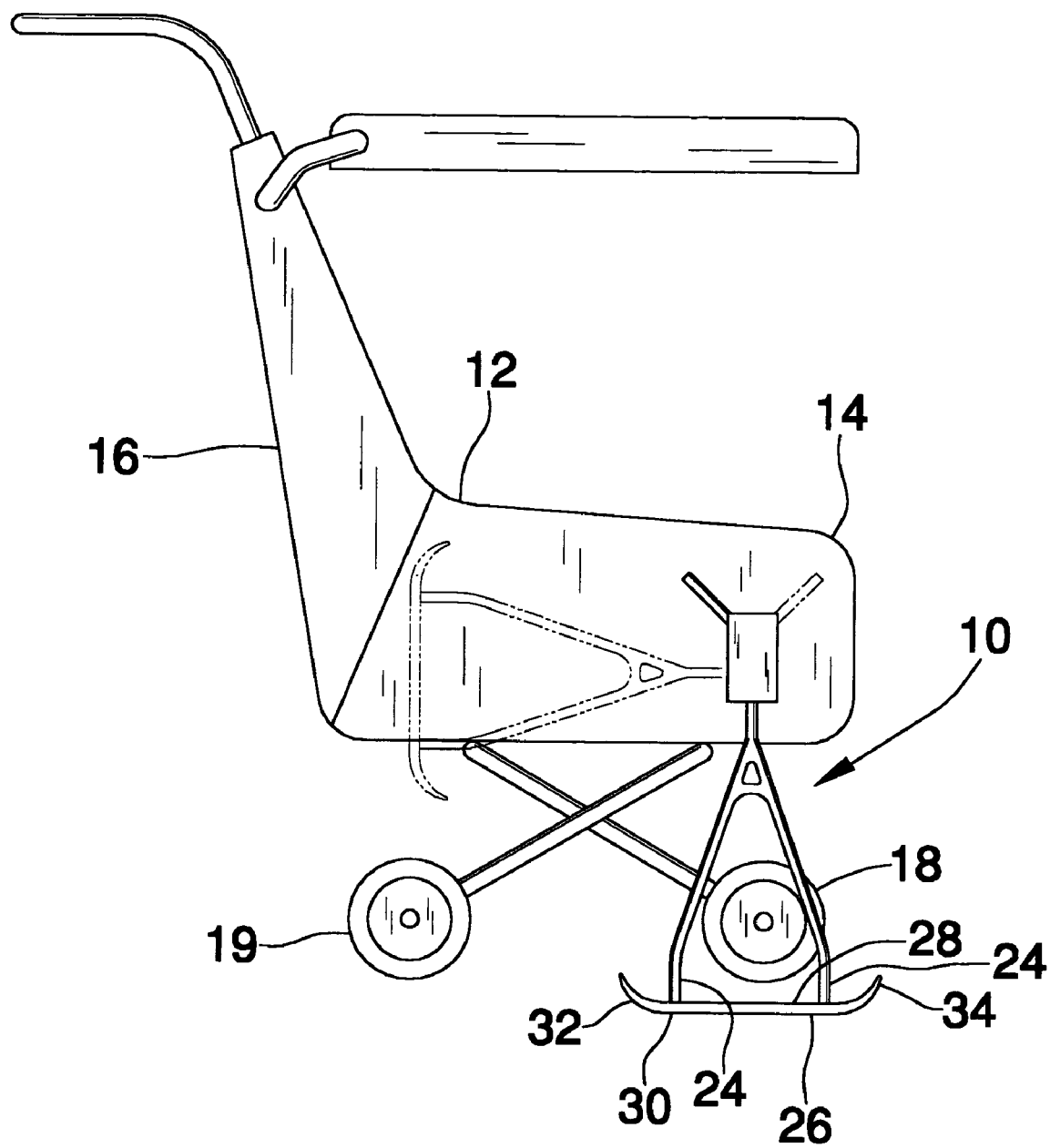
FIG. 1 is a schematic side view of a ski assembly for a stroller according to the present invention.
Figure 2:
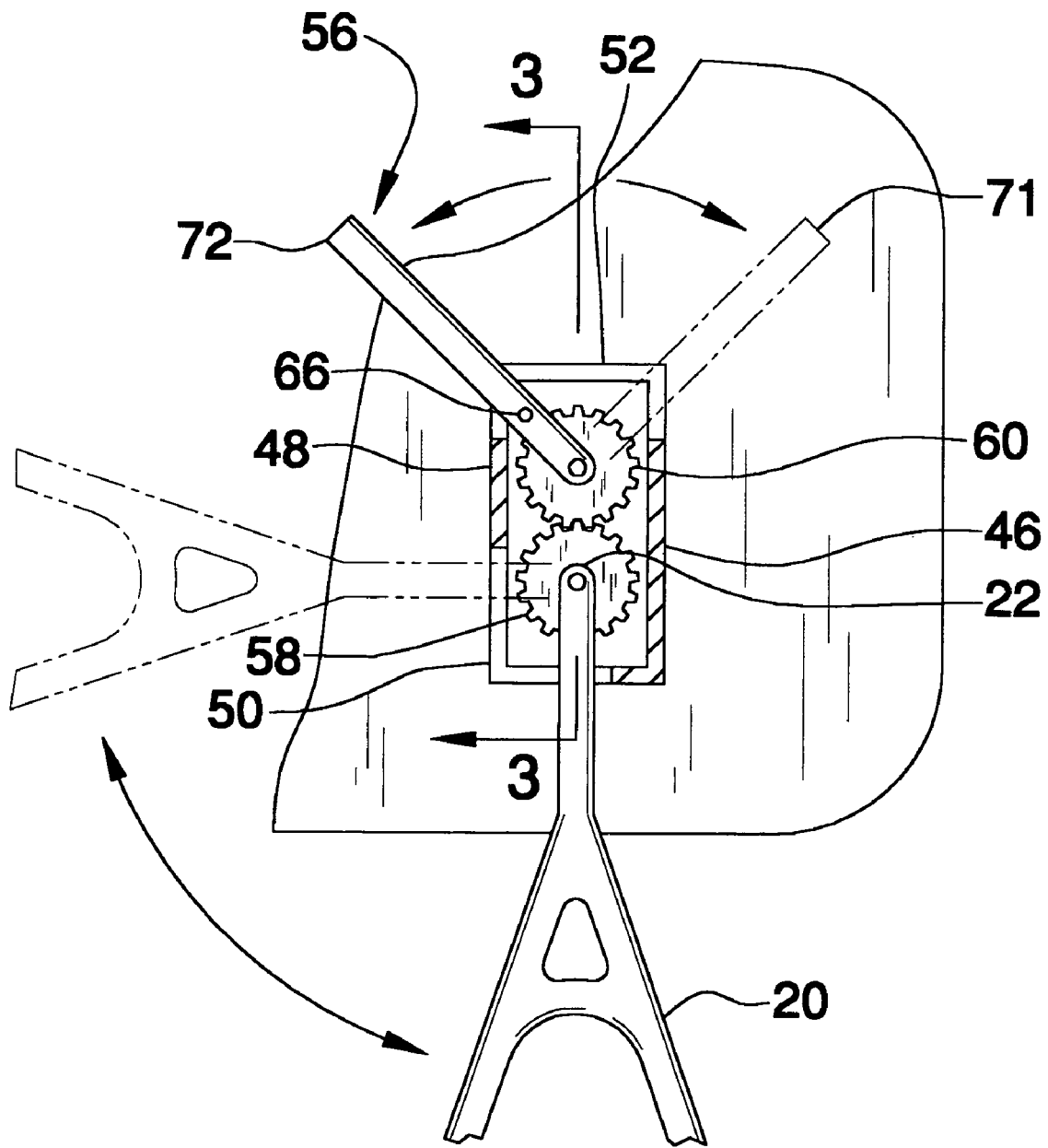
FIG. 2 is a schematic cross-sectional view taken along line 2—2 of FIG. 4 of the present invention.
Figure 3:
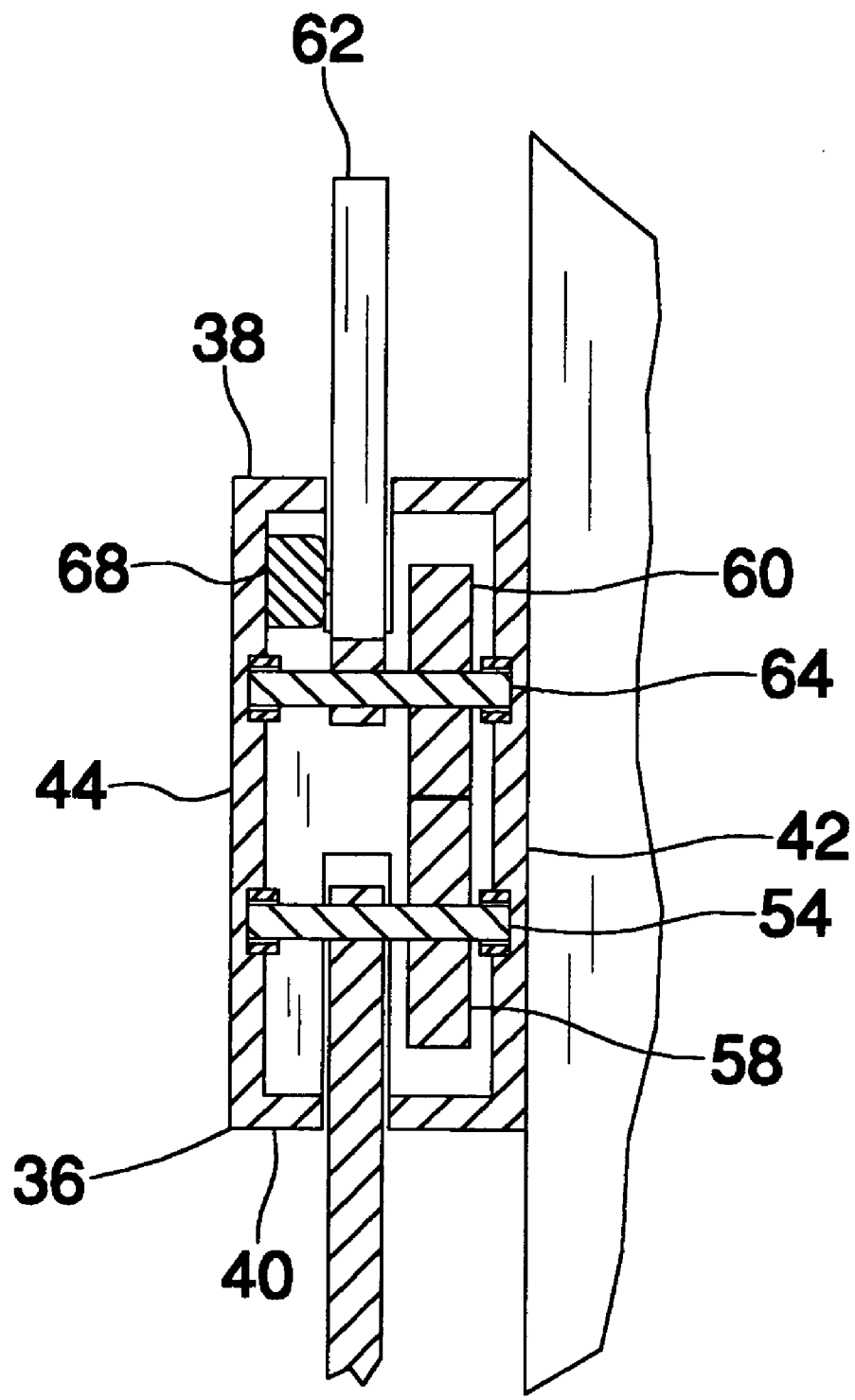
FIG. 3 is a schematic cross-sectional view taken along line 3—3 of FIG. 2 of the present invention.

With reference now to the drawings, and in particular to FIGS. 1 through 4 thereof, a new ski attachment device embodying the principles and concepts of the present invention and generally designated by the reference numeral 10 will be described.

As best illustrated in FIGS. 1 through 4, the ski assembly 10 for a stroller generally comprises a device for a conventional stroller assembly 12 having a chair portion 14, a back portion 16 and a plurality of wheels including front 18 and back 19 wheels attached to the chair portion 14. The ski assembly 10 includes a leg 20 having an upper end 22 and a lower end 24. The leg may be forked at the lower end 24 as depicted in FIG. 1. A ski 26 has an upper surface 28, a lower surface 30, a back end 32 and a front end 34. The lower end 24 of the leg 20 is attached to the upper surface 28 of the ski 26.

A housing 36 has a top wall 38, a bottom wall 40, a first lateral wall 42 and a second lateral wall 44, a front wall 46, and a back wall 48. The first lateral wall 42 is attached to a side wall of the chair portion 14 and is positioned generally above one of the front wheels 18. The first lateral wall 42 may be attached to the side wall of the chair portion 14 with a pressure sensitive adhesive or mechanical fasteners such as screws. Alternatively, the housing 36 may be integrally coupled to the chair portion 14 if the ski assembly 10 is not a retrofitted device. The housing 36 has a first slot 50 therein extending through the bottom wall 40 and upwardly through the back wall 48. The housing 36 has second slot 52 therein positioned in the top wall 38 and extending downwardly into the front 46 and back 48 walls.

An axle 54 is rotatably mounted in the housing 36 and extends between the first 42 and second 44 lateral walls. The axle 54 extends through and is attached to the leg 20 adjacent to the upper end 22 such that the leg 20 is rotatably coupled to the housing 36 and the leg extends downwardly through the first slot 50. The axle 54 is orientated substantially perpendicular to a longitudinal axis of the ski 26. The ski 26 may be positioned in a substantially horizontal lowered position or in a substantially vertical lifted position adjacent to the chair portion. A length of the leg 20 from the axle 54 to the ski 26 is greater than a distance from the axle 54 to a lowest surface of the front wheel 18. This positions the ski 26 at a point lower than the front wheel 18 when the ski 26 is in the lowered position.

An actuator 56 is mechanically coupled to the axle 54 for selectively positioning the ski 26 in the lifted position or the lowered position. The actuator 56 includes a first gear 58 that is mounted on the axle 54 so that rotation of the first gear 58 rotates the axle 54. A second gear 60 is rotatably mounted in the housing 36 and engages the first gear 58. A lever 62 is attached to the second gear 60 for selectively rotating the second gear 60. This may be done with an attached second axle 64. The lever 62 extends upwardly through the second slot 52. Moving the lever 62 in a first position 71 adjacent to the front wall 46 raises the ski 26 into the lifted position and moving the lever 62 in a second position 72 adjacent to the back wall 48 lowers the ski 26 into the lower position. A locking member is attached to the lever 62 for selectively locking the lever 62 in the first position 71 or the second 72 position. The locking member preferably includes a detent ball 66 mounted on the lever 62. A block 68 is mounted on the inner surface of the second wall 44 and is positioned between the front wall 46 and the back wall 48. The block 68 is positioned so that it abuts the detent ball 66 when the lever 62 is between the first and second positions. The detent ball 66 must be forced passed the block 68 when moving back and forth between the first 71 and second 72 positions. This retains the lever 68 in the first 71 or second 72 position.

Figure 4:
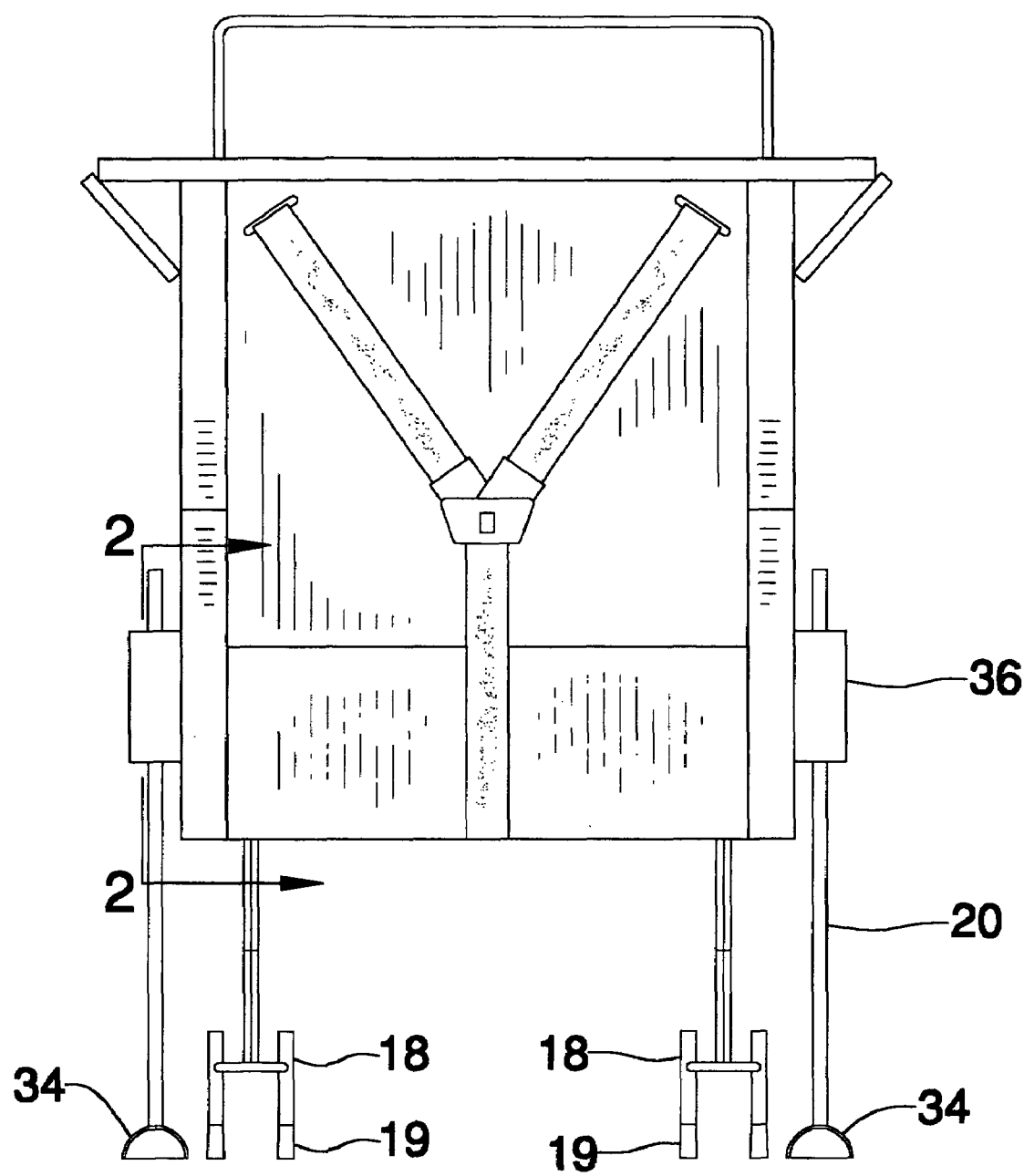
FIG. 4 is a schematic front view of the present invention.

In use, preferably two of the ski assemblies 10 are attached to the stroller 12, as shown in FIG. 4, with one assembly 10 on either side of the chair portion 14. When the stroller 12 is moved through snow, the skis 26 may be moved into the lowered position. Because of the length of the legs 20, the skis 26 are lower than the front wheels 18 of the stroller 12 and the front wheels 18 are lifted off of a ground surface when the skis 26 are in the lowered position. The skis 26 allow for easier movement through snow and for greater turning ability of the stroller 12.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A ski attachment for a stroller assembly, the stroller assembly having a chair portion, a back portion, a plurality of wheels being attached to said chair portion, said attachment including:
   a leg having an upper end and a lower end;
   a ski having an upper surface, a lower surface, a back end and a front end, said lower end of said leg being attached to said upper surface of said ski, said leg being rotatably coupled to said chair portion such that said ski may be positioned in a substantially horizontal lowered position or in a substantially vertical lifted position adjacent to the chair portion; and
   a housing having a top wall, a bottom wall, a first lateral wall, a second lateral wall, a front wall, and a back wall, said first lateral wall being attached to a side wall of the chair portion and being positioned generally above a front one of the wheels, said housing having a first slot therein extending through said bottom wall and upwardly through said back wall said housing having second slot therein positioned in said top wall and extending downwardly into said front and back walls, an axle being rotatably mounted in said housing and extending between said first and second lateral walls, said axle extending through and being attached to said leg adjacent to said upper end such that said leg is rotatably coupled to said housing and said chair portion, said leg extending downwardly through said first slot said axle being orientated substantially perpendicular to a longitudinal axis of said ski.

2. The ski attachment according to claim 1, a length of said leg from said axle to said ski being greater than a distance from said axle to a lowest surface of the front wheel.

3. The ski attachment according to claim 2, further including an actuator being mechanically coupled to said axle for selectively positioning said ski in said lifted position or said lowered position.

4. The ski attachment according to claim 1, further including an actuator being mechanically coupled to said axle for selectively positioning said ski in said lifted position or said lowered position.

5. The ski attachment according to claim 4, wherein said actuator includes:
   a first gear being mounted on said axle, wherein rotation of said first gear rotates said axle;
   a second gear being rotatably mounted in said housing and engaging said first gear;
   a lever being attached to said second gear for selectively rotating said second gear, said lever extending upwardly through said second slot, wherein moving said lever in a first position adjacent to said front wall raises said ski into said lifted position and moving said lever in a second position adjacent to said back wall lowers said ski into said lower position; and
   a locking member being attached to said lever for selectively locking said lever in said first position or said second position.

6. A ski attachment for a stroller assembly, the stroller assembly having a chair portion, a back portion, a plurality of wheels being attached to said chair portion, said attachment including:
   a leg having an upper end and a lower end;
   a ski having an upper surface, a lower surface, a back end and a front end, said lower end of said leg being attached to said upper surface of said ski;
   a housing having a top wall, a bottom wall, a first lateral wall, a second lateral wall, a front wall, and a back wall, said first lateral wall being attached to a side wall of the chair portion and being positioned generally above a front one of the wheels, said housing having a first slot therein extending through said bottom wall and upwardly through said back wall, said housing having second slot therein positioned in said top wall and extending downwardly into said font and back walls;
   an axle being rotatably mounted in said housing and extending between said first and second lateral walls, said axle extending through and being attached to said leg adjacent to said upper end such that said leg is rotatably coupled to said housing and said leg extends downwardly through said first slot, said axle being orientated substantially perpendicular to a longitudinal axis of said ski, wherein said ski may be positioned in a substantially horizontal lowered position or in a substantially vertical lifted position adjacent to the chair portion, a length of said leg from said axle to said ski being greater than a distance from said axle to a lowest surface of the front wheel;
   an actuator being mechanically coupled to said axle for selectively positioning said ski in said lifted position or said lowered position, said actuator including;
      a first gear being mounted on said axle, wherein rotation of said first gear rotates said axle;

a second gear being rotatably mounted in said housing and engaging said first gear;

a lever being attached to said second gear for selectively rotating said second gear, said lever extending upwardly through said second slot, wherein moving said lever in a first position adjacent to said front wall raises said ski into said lifted position and moving said lever in a second position adjacent to said back wall lowers said ski into said lower position; and a locking member being attached to said lever for selectively locking said lever in said first position or said second position.

* * * * *